United States Patent
Stojancic (10) Patent No.: US 8,385,644 B2
(45) Date of Patent: Feb. 26, 2013

(54) DIGITAL VIDEO FINGERPRINTING BASED ON RESULTANT WEIGHTED GRADIENT ORIENTATION COMPUTATION

(75) Inventor: Mihailo M. Stojancic, San Jose, CA (US)

(73) Assignee: Zeitera, LLC, Mountain View, CA (US)

( * ) Notice: Subject to any disclaimer, the term of this patent is extended or adjusted under 35 U.S.C. 154(b) by 870 days.

(21) Appl. No.: 12/491,896

(22) Filed: Jun. 25, 2009

(65) Prior Publication Data
US 2010/0007797 A1 Jan. 14, 2010

Related U.S. Application Data

(60) Provisional application No. 61/078,941, filed on Jul. 8, 2008.

(51) Int. Cl.
*G06K 9/00* (2006.01)
(52) U.S. Cl. .......................... 382/170; 382/190; 382/305
(58) Field of Classification Search .................. None
See application file for complete search history.

(56) References Cited

U.S. PATENT DOCUMENTS

| 8,175,413 B1 * | 5/2012 | Ioffe et al. ...................... 382/283 |
| 2005/0108745 A1 * | 5/2005 | Linzer ............................. 725/19 |
| 2008/0310731 A1 * | 12/2008 | Stojancic et al. ............. 382/195 |
| 2008/0317278 A1 * | 12/2008 | Lefebvre et al. ............. 382/100 |

OTHER PUBLICATIONS

Massoudi et al., "A Video Fingerprint Based on Visual Digest and Local Fingerprints" IEEE, 2006, pp. 2297-2300.*

* cited by examiner

*Primary Examiner* — Brian P Werner
(74) *Attorney, Agent, or Firm* — Law Offices of Peter H. Priest, PLLC (57) ABSTRACT

Video sequence processing with various filtering rules is applied to extract dominant spatial features and generate unique set of signatures describing video content. Accurate active regions are determined for each video sequence frame. Subsequently, a video sequence is structured by tracking statistical changes in the content of a succession of video frames, and suitable frames are selected for further spatial processing. Selected video frames are processed for feature extraction and description, and compact representative signatures are generated, resulting in an efficient video database formation and search.

17 Claims, 8 Drawing Sheets

DIGITAL VIDEO FINGERPRINTING BASED ON RESULTANT WEIGHTED GRADIENT ORIENTATION COMPUTATION

CROSS REFERENCE TO RELATED APPLICATION

The present application claims the benefit of U.S. Provisional Patent Application No. 61/078,941 entitled "Content Based Digital Video Fingerprinting Based on Resultant Weighted Gradient Orientation Computation", filed on Jul. 8, 2008 which is hereby incorporated by reference in its entirety.

The patent application entitled "Methods and Apparatus for Providing a Scalable Identification of Digital Video Sequences" application Ser. No. 12/141,163 filed on Jun. 18, 2008 and having the same assignee as the present application is a related application and hereby incorporated by reference.

The patent application entitled "Method and Apparatus for Multi-dimensional Content Search and Video Identification" filed on Jun. 18, 2008, and having the same assignee as the present application is a related application and hereby incorporated by reference.

FIELD OF THE INVENTION

The present invention relates generally to improvements in video processing architecture for feature extraction from a digital video sequence. More particularly, the present invention addresses methods and apparatuses for video sequence structuring, subsequent video sequence characterization, and efficient signature generation for large video database indexing and search.

BACKGROUND OF THE INVENTION

Video applications which include video database browsing and identification will have explosive growth over the next a few years. To address this growth, there is a need for a comprehensive solution related to the problem of indexing of a video sequence database and the identification of particular video sequences within that database. Major applications include large video database mining and identifying similar videos for the purpose of copyright protection, advertising and surveillance. Due to the large size of such databases and the density of video files, high performance video identification and search technology is needed. Robust video content identification and copyright protection should be resistant to any intentional or unintentional video content change or distortion, and the design should be scalable and capable of handling very large video databases and long video sequences.

Increasing demand for such solutions, which include standard definition (SD) and high definition (HD) formats of video, requires increasing sophistication, flexibility, and performance in the supporting algorithms and hardware. The sophistication, flexibility, and performance requirements exceed the capabilities of current generations of software based solutions, in many cases, by an order of magnitude.

SUMMARY OF THE INVENTION

In one or more of its several aspects, the present invention recognizes and addresses problems such as those described above. To such ends, an embodiment of the invention addresses a method for content based video sequence identification. Active regions are determined in frames of a video sequence. A set of video frames is selected in response to temporal statistical characteristics of the determined active regions. Spatial video features are extracted from the selected video frames and multi-dimensional content based signatures are generated based on the extracted video features that identify the video sequence.

In another embodiment of the invention, a method for generating a multi-bit signature based on spatial domain video frame processing is described. An active area of a video frame is tiled according to a functional grid to form a tiled functional space in the active area having multiple tile bins. Spatial video features are extracted from the tile bins based on a gradient vector and orientation of pixels in the tile bins and multiple type multi-bit signatures are generated based on the extracted video features.

These and other features, aspects, techniques and advantages of the present invention will be apparent to those skilled in the art from the following detailed description, taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perk use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

Figure 1:
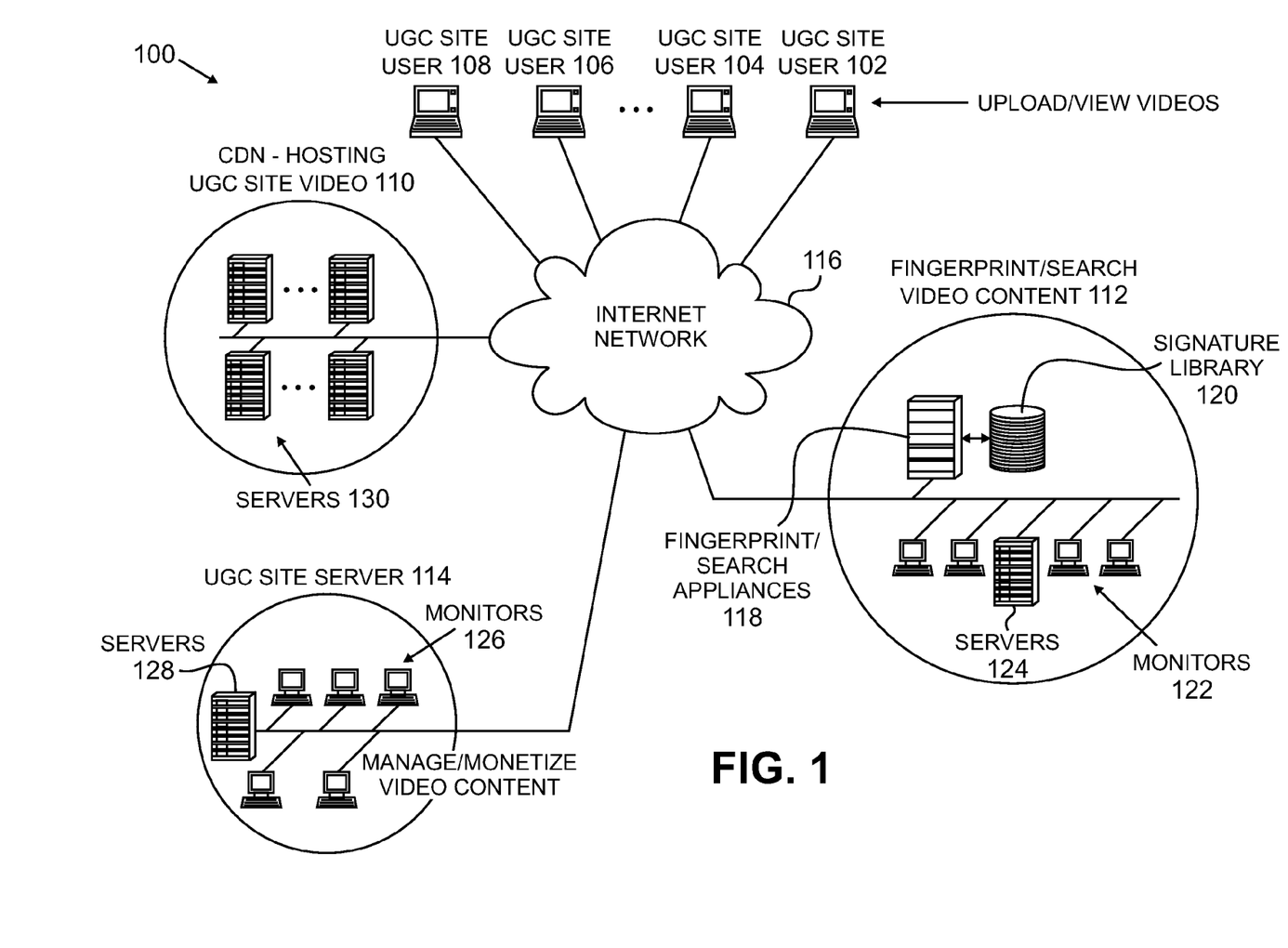
FIG. 1 illustrates an Internet networking system for content based video fingerprinting and identification in accordance with an embodiment of the present invention.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor. FIG. 1 illustrates a system 100 for both video fingerprinting and identification, and video content based management in accordance with an embodiment of the present invention. This approach targets user generated content (UGC) Internet Web sites. User sites 102-108 generate user video content which is uploaded to a UGC Internet Web company where it may be stored in a server and storage subsystem 128. Alternatively, the video content may be redirected to a third party server system providing service to the UGC Internet Web company. For example, third party server system 110 with an array of servers 130 hosts user generated video content and provides service to the UGC Internet Web company with UGC site server system 114, with their servers and storage subsystem 128 and monitors 126. A video fingerprinting and video identification system 112 utilizes a video fingerprinting and search appliance 118, a video database 120 containing a signature library, and servers 124 with user terminal/monitors 122. The Internet network 116 allows for remote system location interconnect, and information exchange and management.

The video fingerprinting and video identification system 112 in FIG. 1 is scalable and utilizes highly accurate video fingerprinting and identification technology that checks unknown video content against a database of previously fingerprinted video content, which is considered an accurate or "golden" database. The video fingerprinting and video identification system 112 is different from commonly deployed systems in that it extracts features from the video itself and does not rely on a hash of a file, metadata or the audio stream that accompanies a video. The video fingerprinting and video identification system 112 allows a UGC site server system 114 to configure a "golden" database specific to its business requirements. A self-contained video fingerprinting and search appliance 118 that is configured to sit on the Internet network 116 within the video fingerprinting and video identification system 112, compares video streams against a database of signatures in the video database 120, that has been previously generated. The video fingerprinting and search appliance 118 allows a UGC site server system 114 to automatically flag multiple copies or reoccurring versions of popular uploads, automatically flag content previously identified for removal, as well the content identified under a takedown notice, content not appropriate for a site, such as inappropriate, violent, racist, or the like content, and correlate results from other filtering methods, allowing a much higher overall accuracy than found with existing technologies.

Each of the appliances and servers, 118, 124, 128, and 130 may include a processor complex having one or more processors, having internal program storage and local user controls such as a monitor, a keyboard, a mouse, a printer, and may include other input or output devices, such as an external file storage device and communication interfaces. The video fingerprinting and search appliance 118 may store programs such as a program implementation of a content based video identification process of the present invention or have access to such programs through electronic media, such as may be downloaded over the Internet from an external server, accessed through a universal serial bus (USB) port from flash memory, accessed from disk media of various types, or the like.

The video fingerprinting and search appliance 118 has access to the video database 120 which may be accessed by software programs operating from the appliance 118, for example. The video database 120 may store the video archives, as well as all data related to inputs to and outputs from the video fingerprinting and video identification system 112, and a plurality of video fingerprints that have been adapted for use as described herein and in accordance with the present invention. It is noted that depending on the size of an installation, the functions of the video fingerprinting and search appliance 118 and the management of the video database 120 may be combined in a single server running separate program threads for each function.

The video fingerprinting and video identification system 112 may also suitably include one or more servers 124 and user terminals/monitors 122. Each of the user terminals/monitors 122 and the video fingerprinting and search appliance 118 may be connected directly to the server 124 or indirectly connected to it over a network, such as a local cabled intranet, wireless intranet, the Internet, or the like.

The video fingerprinting and search appliance 118 may comprise, for example, a personal computer, a laptop computer, or the like. The user terminals/monitors 122 may comprise a personal computer equipped with programs and interfaces to support data input and output and video fingerprinting and search monitoring that may be implemented both automatically and manually. The user terminals/ monitors 122 and video fingerprinting and search appliance 118 may also have access to the server 124, and may be accessed from the server 124.

One of the user terminals/monitors 122 may support a graphical user interface utilized to setup video fingerprinting parameters and present the search results. These terminals may further provide miscellaneous administrative functions such as user log-on rights, change of user permissions and passwords, and the like.

One embodiment of the invention describes a method for accurate video frame active region determination based on a three-pass algorithm. During the first pass of the video fame active region determination algorithm frame boundaries are examined line by line in horizontal and vertical direction to determine preliminary inactive boundary areas. The process is based on comparison of a normalized brightness value computed for each successive line with the overall video frame normalized brightness value. The process advances through successive lines at the frame boundaries in both horizontal and vertical direction, starting from the frame outermost lines, until it reaches a line with the normalized brightness greater than certain percentage of the overall normalized brightness computed for the entire frame. This step determines four preliminary boundaries for the frame active region. In the second pass of the algorithm an activity measure is derived for each of the preliminary boundary region, based on a gradient vector intensity computed for each pixel and a normalized sum of the gradient vector intensities computed for each region. The activity measure for each identified boundary region is compared against an activity threshold and based on this comparison it is decided whether to go into the third step of active region determination, or accept the preliminary active region boundaries determined in the first step of the algorithm. The third step of the active region determination algorithm is a repeat of the first step of the boundary region line brightness examination but with adjusted percentage of the normalized average brightness computed for the entire frame used as a threshold parameter for comparison. After the third step, the boundaries of the active region are determined for the frame, and the inactive frame regions are discarded. The process of active region determination is repeated for each frame of a video sequence.

A set of video frames are selected for further processing in response to temporal statistical characteristics of the determined active regions. Video features are extracted from the selected video frames and multi-dimensional content based signatures are then generated based on the extracted video features that identify the video sequence.

In another embodiment of the invention a method is described for efficient video sequence processing and spatial content based feature/signature formation based on a number of regions, groups of pixels, in a video frame mapped onto a set of weighted pixel orientation space. For each video sequence selected frame spatial pixel orientation is computed from the two dimensional derivative determined at each pixel (x,y) coordinate position, providing a spatial gradient vector with its intensity and orientation parameters. In a video frame partitioned into K regions with variable number of pixels, a resultant weighted orientation that is weighted by a gradient vector intensity is computed for each region and subsequently used for signature generation. A content based video database is formed to hold signatures which are based on the content of the video sequence.

Another embodiment of the invention addresses a method for video sequence structuring. Mean absolute difference (MAD) values are computed for contiguous pairs of video frame active regions in a succession of video frames in a video sequence. A temporal statistical function $f_0(n)$ is generated in response to the MAD values. The $f_0(n)$ function is a time series with its samples having identical values as the MAD values computed for the entire video sequence. The $f_0(n)$ function is partitioned with a programmable size sliding window into multiple overlapping temporal partitions. The starting point of each sliding window in time succession is attached to local extrema of $f_0(n)$, alternately a maximum or a minimum value, determined within the scope of the previous sliding window position. Video frames are selected for further spatial processing at local extrema position of $f_0(n)$, alternately a maximum or a minimum position within the scope of each sliding window.

Figure 2:
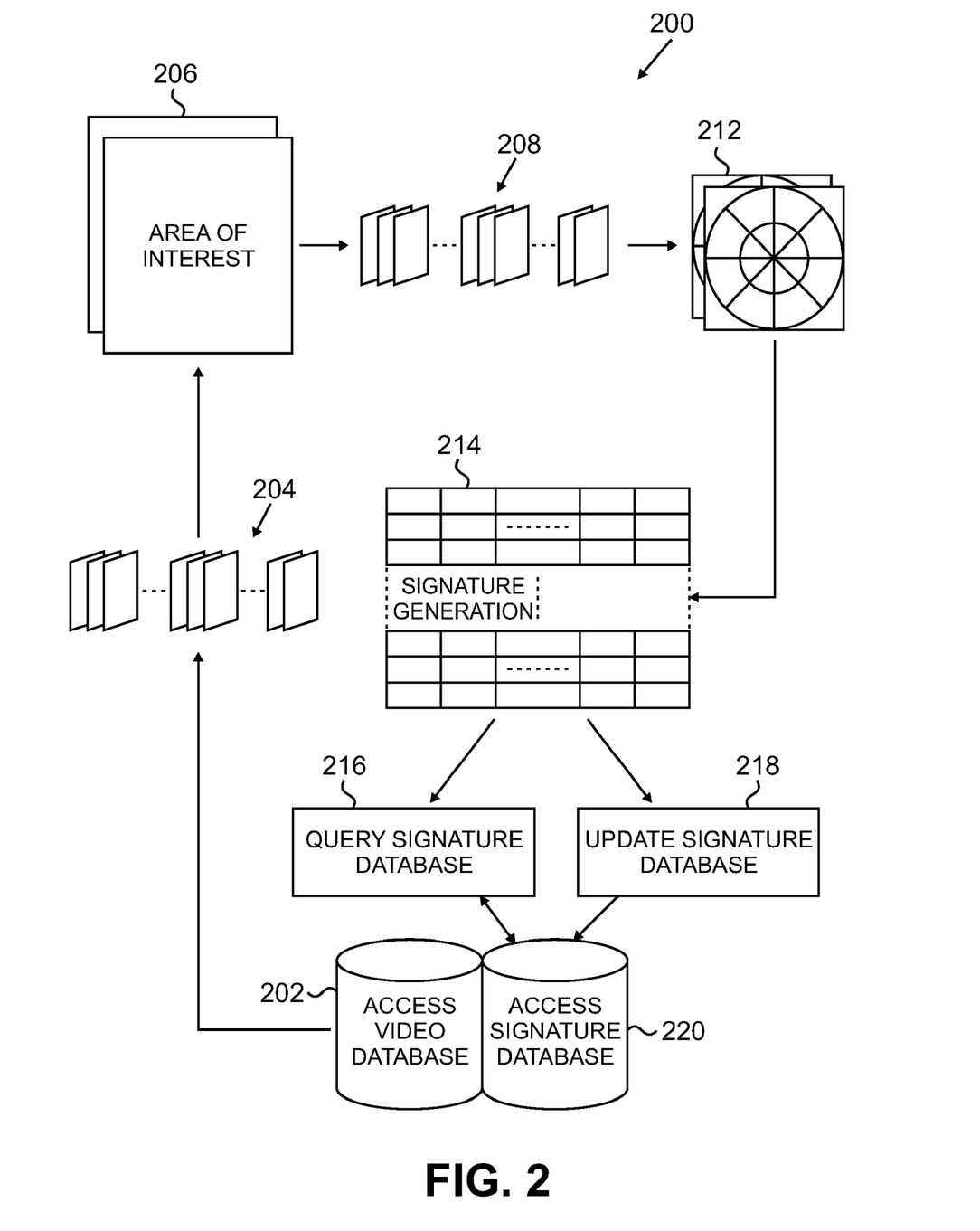
FIG. 2 illustrates a process for content based video feature extraction, signature generation, and database formation and search in accordance with an embodiment of the present invention.

FIG. 2 illustrates a process 200 for content based video feature extraction, signature generation, and database formation and search. For use herein, a video sequence is defined as a plurality of video frames presented sequentially in time. As shown in FIG. 2, the basic functionality of a video sequence signature (video fingerprint) database formation consists of selecting a video sequence in step 204 from a video database in access step 202, and processing the video sequence in a series of process steps 206, 208, 212, 214, and 218 as follows. An analysis process step 206 includes processing a video sequence by video frame filtering for noise reduction and desired active region determination for each video frame as described in more detail below. A temporal statistics and suitable frame selection process step 208 includes temporal statistics collection and selection of a set of video frames for further processing. A spatial video frame analysis process step 212 includes gradient vector generation for each pixel and resultant weighted gradient vector orientation computation for groups of pixels. The spatial video frame analysis process step 212 further includes resultant weighted gradient vector orientation computation for K N×M frame regions, as described in flowchart 900 of FIG. 9. A signature generation process step 214 derives multi-dimensional signatures, video fingerprints, of compact size, as described in more detail below with regard to signature generation flowchart 1000 of FIG. 10. An update process step 218 is utilized to insert a set of compact signatures into the signature database in access step 220 to be used for video sequence search and identification.

As the output of the above processing, a number of results are presented including the count of similar videos found, the count of not identified videos, statistics with respect to precise timing of matching video reference frames, and the confidence factors associated with each identified video.

A similar process is followed in the video sequence search/identification process. A compressed or raw video sequence to be identified is provided, for example, from a video database in access step 202 and processed in a series of process steps 204, 206, 208, 212, 214, and 216. The query process step 216 includes processing to deliver a set of videos closely matching the original one.

The active region of a video frame is determined in step 206 during video frame processing by examining the frame horizontal and vertical boundaries with respect to the total normalized average brightness of the frame and by simultaneously measuring the activity in each horizontal/vertical candidate boundary region, considered to be discarded. The activity measure, used in the second step, is derived with respect to the average intensity of a spatial gradient vector, equation (2), computed for each pixel in candidate boundary regions to be discarded previously determined by examining the total normalized average brightness for the region lines.

The active region determination process is a three-step process. In the first step, for every horizontal top and bottom line of pixels and vertical left and right line of pixels of a video frame, a normalized average brightness level is computed and then compared to the total normalized average brightness for the entire frame. If the normalized average brightness for a line of pixels is below a certain percentage of the total normalized average brightness for the frame (frame brightness threshold) that line is skipped. This process is continued starting from the outermost boundary of the frame until a region is reached where no normalized average brightness for a line is less than the given percentage of the total normalized average brightness for the frame. At this point the successive frame line examination process is stopped, and the second step is started, which examines the activity measure of the preliminary boundary regions determined as candidates to be discarded.

In the second step of active region determination, for each non-zero candidate region around the frame boundaries (previously determined by using the line brightness thresholding), a gradient vector intensity is computed for each pixel, according to equation (2), and a normalized average sum of the gradient vector intensities is computed for the entire boundary region. This normalized average sum of the gradient vector intensities (activity measure for the preliminary boundary region to be discarded) is compared to an activity threshold parameter. If the activity measure for the boundary region shows sufficiently high activity (indicated by the activity threshold parameter), then the process of active region determination based on the line brightness is repeated in the third step with adjusted percentage of the normalized average brightness for the entire frame used as a threshold parameter for comparison. In the third step of the active region determination process, the frame brightness threshold parameter is adjusted in accordance to the activity measure test results, and the first step is repeated with these adjusted frame brightness threshold parameter. In case the activity measure for a preliminary boundary region is below the activity threshold (not showing sufficient activity), the preliminary boundary region to be discarded is accepted as final.

The region of the frame, enclosed with frame lines brighter than the given revised, or not revised, frame brightness threshold, represents the frame active region. The frame area up to the boundaries of the active region is discarded.

A number of frames within a video sequence, selected as described in the above section on frame selection step 208, are filtered by a set of filtering rules in frame filtering step 212 in order to generate a set of spatial signatures in step 214 of FIG. 2. The set of spatial signatures include, but are not limited to, signatures derived by sampling bits on a tiled grid, such as a rectangular or a log-polar grid, or alternatively, signatures derived from a histogram of weighted pixel orientation ratios computed for an array of small regions tiling the active area of a frame, such as 4×4 pixel regions.

The spatial video frame analysis process step 212 will be described next. It includes a method of computing the pixel intensity gradient and phase angle, as well as a weighted orientation value used for signature generation.

Figure 3:
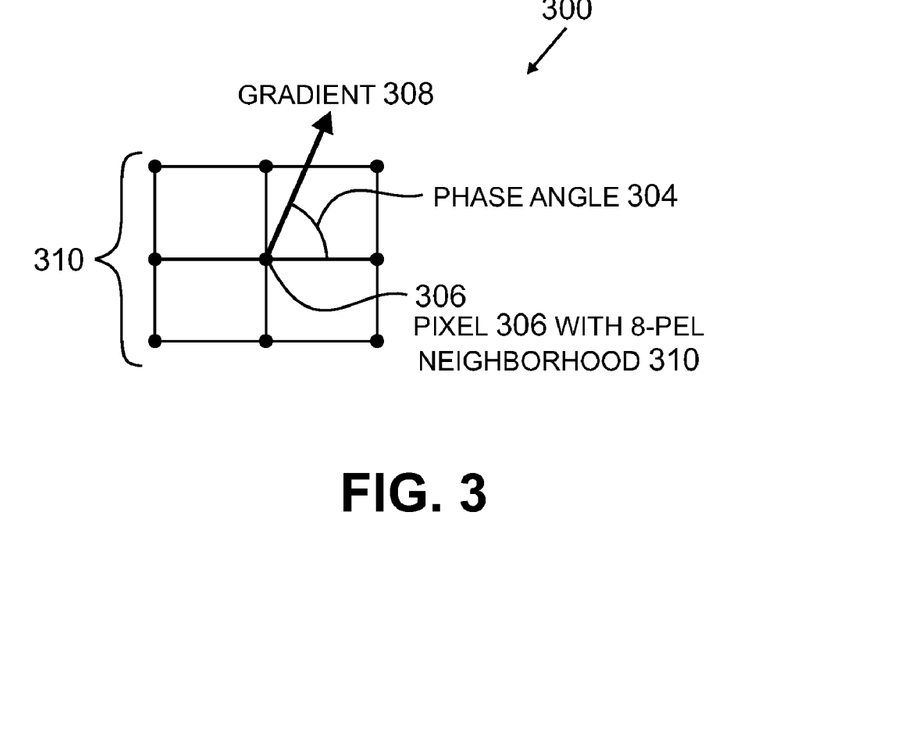
FIG. 3 illustrates an intensity gradient and orientation (phase angle) graph in accordance with an embodiment of the present invention.

FIG. 3 shows a pixel intensity gradient and orientation (phase angle) graph 300 with a pixel 306 at position (x,y) and its 8-pixel neighborhood 310. The intensity gradient vector [G(x) G(y)] 308 for a pixel intensity f(x,y) 306 is computed as a two dimensional derivative $$[G_x(x), G_y(y)] = [\partial f(x,y)/\partial x, \partial f(x,y)/\partial y]. \tag{1}$$

Figure 4:
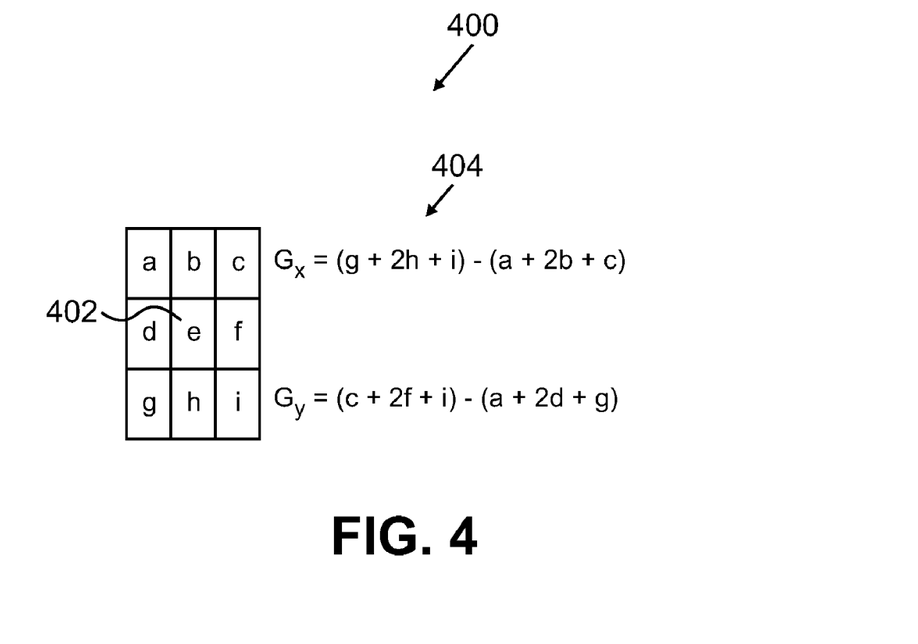
FIG. 4 illustrates an example of a pixel intensity gradient approximation technique based on 8-neighbor pixels in accordance with an embodiment of the present invention.

The 2D derivative computation is approximated with the operator presented in pixel intensity gradient approximation 400 of FIG. 4, where the pixel intensity f(x,y) 306 is positioned at point 'e' 402 of FIG. 4.

Based on the $G_x$ and $G_y$, the gradient vector intensity for each pixel $G_p$ is computed as $$G_p = \sqrt{[G_x^2 + G_y^2]}, \tag{2}$$

and the corresponding phase angle (orientation) for each pixel $\theta_p$ is computed as $$\theta_p = \arctan(G_y/G_x). \tag{3}$$

For a region with "n" pixels the sum of intensity gradients is computed as a region gradient intensity $G_c$ according to $$G_c = \Sigma_n G_p, \tag{4}$$

and the weighted sum of orientation angle is computed as a region weighted orientation $\theta_c$ according to $$\theta_c = \Sigma_n G_p \theta_p. \tag{5}$$

The resultant weighted gradient vector orientation $\Omega_k$ for the k-th region of n pixels is computed as $$\Omega_k = \Sigma_n (G_p \theta_p)/\Sigma_n G_p. \tag{6}$$

Similarly, the resultant weighted gradient vector orientation $\Omega$ for a functional space "f" is computed for the entire functional space inscribed in the active region of a frame according to $$\Omega = \Sigma_f (G_p \theta_p)/\Sigma_f G_p, \tag{7}$$

where summation is performed over all pixel in the functional space. The $\Omega_k$ and $\Omega$ values will be used for signature derivation in the way described below.

A number of presently preferred methods of signature derivation are used in the signature generation process steps 212 and 214. In one embodiment of this invention signature bits are derived from a fixed number of sub-regions in a functional space such as a log-polar functional space 500, or a rectangular functional space 600 inscribed in the frame active region, as presented in FIGS. 5 and 6. Each sub-region 504, 604 in a functional space is associated with a resultant weighted gradient vector orientation $\Omega_k$, computed in equation (6), and a signature is derived with reference to the total resultant weighted gradient vector orientation $\Omega$, computed in equation (7) for the entire functional space (collection of regions). The signature generation process is described in more detail below.

In an embodiment of the invention, a log-polar functional space is inscribed into the active area of a video frame to form multiple log-polar bins. A resultant weighted gradient vector orientation is computed for each log-polar bin and compared to a resultant weighted gradient vector orientation value computed for the entire log-polar functional space. Multi-dimensional signatures are generated by assigning 0 or 1 to the signature bit positions corresponding to log-polar bins, depending whether resultant weighted gradient vector orientation for a bin is greater than or equal, or greater than resultant weighted gradient vector orientation value computed for the entire log-polar functional space.

Figure 5:
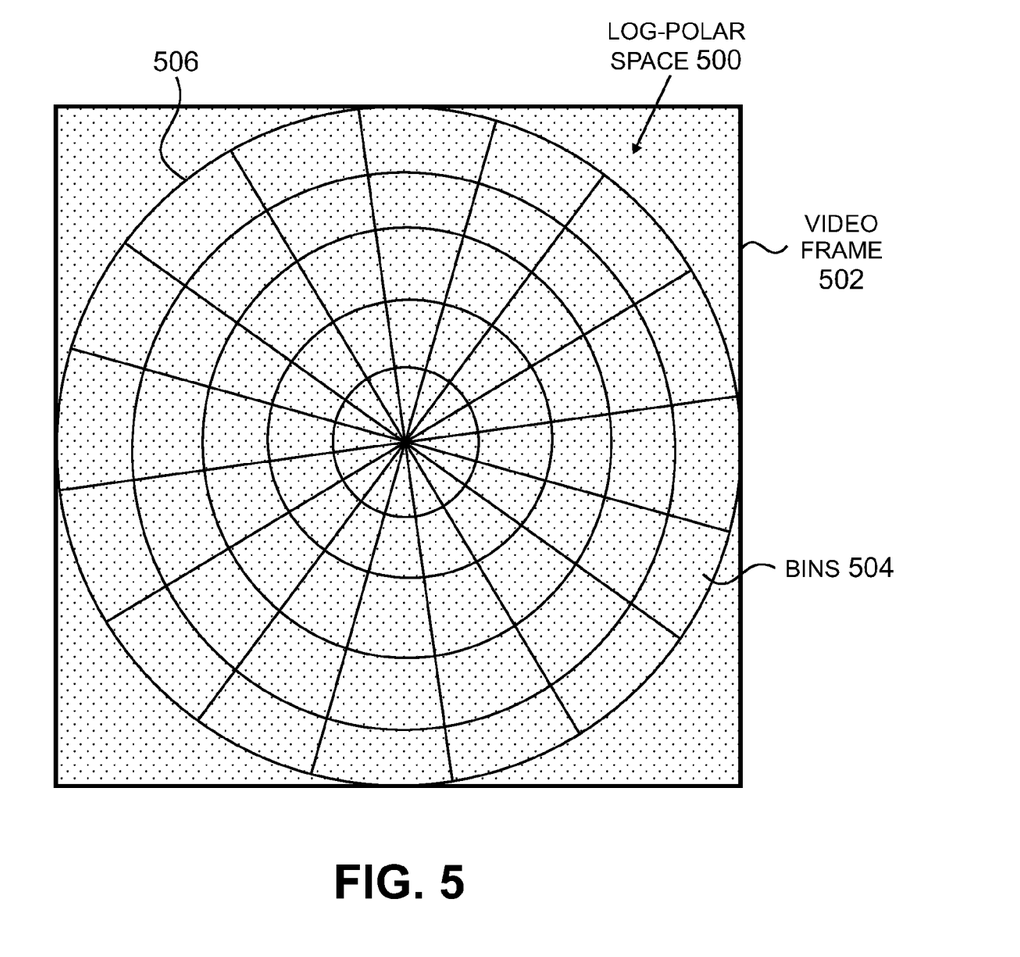
FIG. 5 illustrates an exemplary log-polar functional space inscribed into the video frame active region to form bins for resultant weighted gradient orientation computation in accordance with an embodiment of the present invention.

FIG. 5 illustrates an exemplary log-polar functional space 500 inscribed into the active area of a video frame 502 to form bins, such as bin 504, for $\Omega_k$ computation according to equation (6). The $\Omega$ parameter is computed for the region outlined by the most outer circle 506 according to equation (7). The signature is generated by comparing each bin $\Omega_k$ value to the functional space region $\Omega$ value, and a 0 or 1 is assigned to the corresponding signature bit position depending whether the $\Omega_k$ for a bin is less than or equal to, or greater than the $\Omega$ for the entire functional space, respectively. The set of 0s and 1s corresponding to each bin of the log-polar grid form a multi-dimensional signature for the particular active video frame in question.

In another embodiment of the invention, a method of generating a multi-bit signature is described that is based on spatial gradient vector computation for pixels in an active area of a video frame. A rectangular functional space is inscribed in active area of a video frame to form multiple rectangular bins. Based on spatial gradient vectors computed for pixels in the frame active area resultant weighted gradient vector orientation is computed for each rectangular bin and compared to a weighted gradient vector orientation value computed for the entire rectangular functional space. Multi-dimensional signatures are generated by assigning 0 or 1 to the signature bit positions corresponding to the rectangular bins, depending whether resultant weighted gradient vector orientation for a bin is greater than or equal, or greater than the resultant weighted gradient vector orientation value computed for the entire rectangular functional space.

Figure 6:
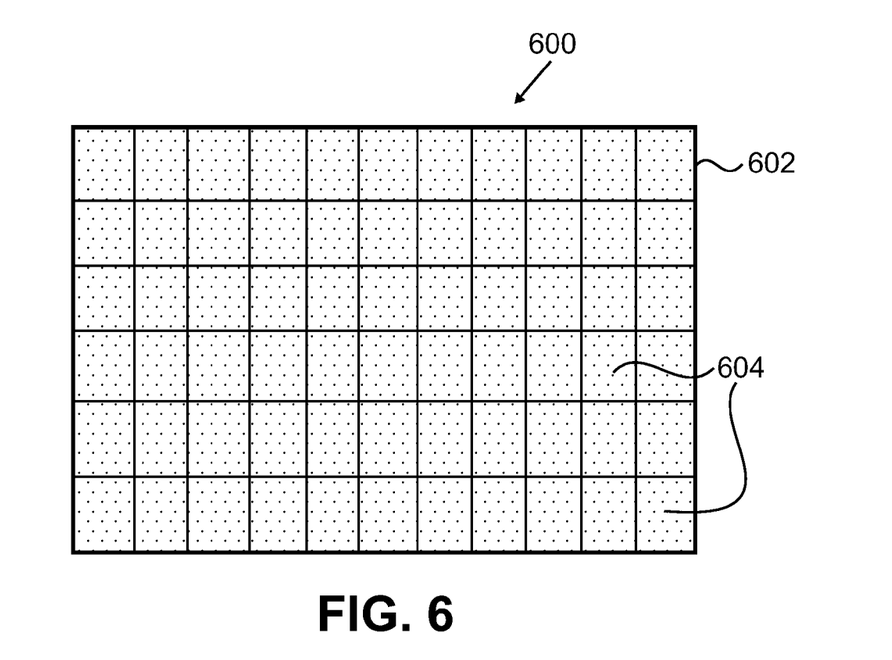
FIG. 6 illustrates an exemplary rectangular functional space inscribed into the video frame active region to form bins for resultant weighted gradient orientation computation in accordance with an embodiment of the present invention.

FIG. 6 illustrates an exemplary rectangular functional space 600 inscribed into the video frame active region to form bins for resultant weighted gradient orientation computation. An exemplary rectangular grid 602 is used as the functional space to form a set of sub-regions 604 for computation of $\Omega_k$ values. The $\Omega$ value, computed for the entire rectangular functional space 602, is used to generate a binary value of 0 or 1, depending whether the $\Omega_k$ value is less than or equal., or greater than the $\Omega$ values respectively. In general, the bins can be of unequal area size. The set of 0s and 1s corresponding to sub-regions of the rectangular grid form a multidimensional signature for the particular frame in question.

Another embodiment of the invention describes a method of forming a histogram of resultant weighted gradient vector orientations computed for a number of small sub-regions covering a frame active region. Multi-bit signatures are derived based on this histogram. Video frame active region is partitioned into N×M sub-regions and resultant weighted gradient vector orientations are computed for each N×M sub-region. A histogram is formed spanning the $\pi$, $-\pi$ range of angles (orientations), with histogram bins spaced in increments of $2\pi/r$. A $k^{th}$ histogram bin covers the range of $(k2\pi/r, (k+1)2\pi/r)$. Each bin represents a count of resultant weighted gradient vector orientation values falling in its range. A mean count of resultant weighted gradient vector orientations is computed for the entire histogram. A signature is generated by comparing each histogram bin count to the mean value of the bin count for the histogram.

Figure 7:
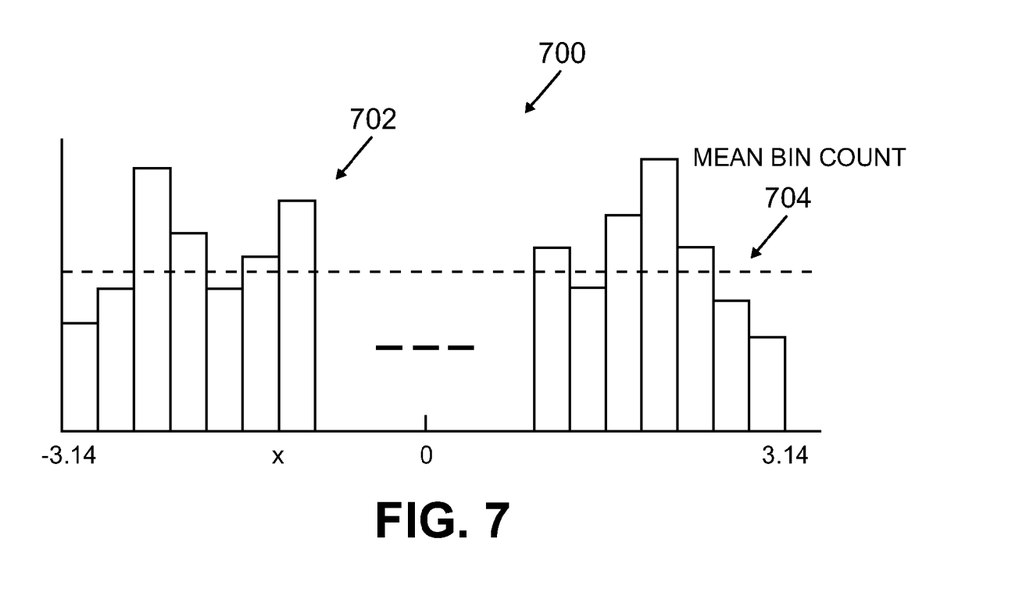
FIG. 7 illustrates an exemplary set of histogram bins arranged in the radian phase space ($-\pi$ to $\pi$) of resultant weighted gradient orientation values computed for a number of rectangular pixel regions tiling the area of a frame active region in accordance with an embodiment of the present invention.

For example, a method of signature derivation is based on thresholding of a histogram of resultant weighted gradient vector orientations $\Omega_n$, n=1, . . . , m, computed for a set of sub-regions of size N×M covering the entire active area of a video frame. FIG. 7 illustrates an exemplary set of histogram bins 700 arranged in the radian phase space ($-\pi$ to $\pi$) of resultant weighted gradient orientation values computed for a number of rectangular pixel regions tiling the area of a frame active region. Each bin contains a count of resultant weighted gradient orientation values falling into an assigned range $(k2\pi/r, (k+1)2\pi/r)$ of the bin space, where k=0, 1, . . . , r-1, and r is the count of histogram bins in accordance with an embodiment of the present invention. For example, an exemplary 1-dimensional set of histogram bins 700, FIG. 7, are used to count the resultant weighted gradient vector orientations $\Omega_n$ falling in a particular range of the phase angle space. The size of pixel sub-regions formed for $\Omega_n$ computation is chosen to be small enough (4×4 pixels, as an example) to provide a good statistical representation of the distribution of $\Omega_n$ values for the entire frame active region.

As computed in equation 6, $\Omega_n$ values represent resultant weighted gradient vector orientations, centered at each sub-region, with the total range in radians of $-\pi$ to $\pi$. For a collection of $\Omega_n$ values from a selected frame, a histogram is formed representing the distribution of these values over a range from $-\pi$ to $\pi$ or approximately $-3.14$ to $3.14$, in radians. As an example, the histogram 700 of FIG. 7 represents 80 histogram bins, each with a span of angles of $2\pi/80$ radians The histogram is populated with computed $\Omega_n$ values in a way that each of the 80 bins holds the count of these values falling in the range of the bin's phase angle (orientation). A threshold parameter 704 is introduced as the mean bin count value. This threshold parameter is used to generate a multidimensional signature as follows. The histogram is scanned left to right and each bin count is compared to the mean bin count that is the threshold parameter 704. If a bin count is less than or equal to the threshold a 0 is assigned to the corresponding signature bit position, otherwise a 1 is assigned to the same bit position. The set of 0s and 1s corresponding to each bin of the histogram 700 form a multidimensional signature for the frame active region under consideration. The above example will generate an 80-bit signature.

Figure 8:
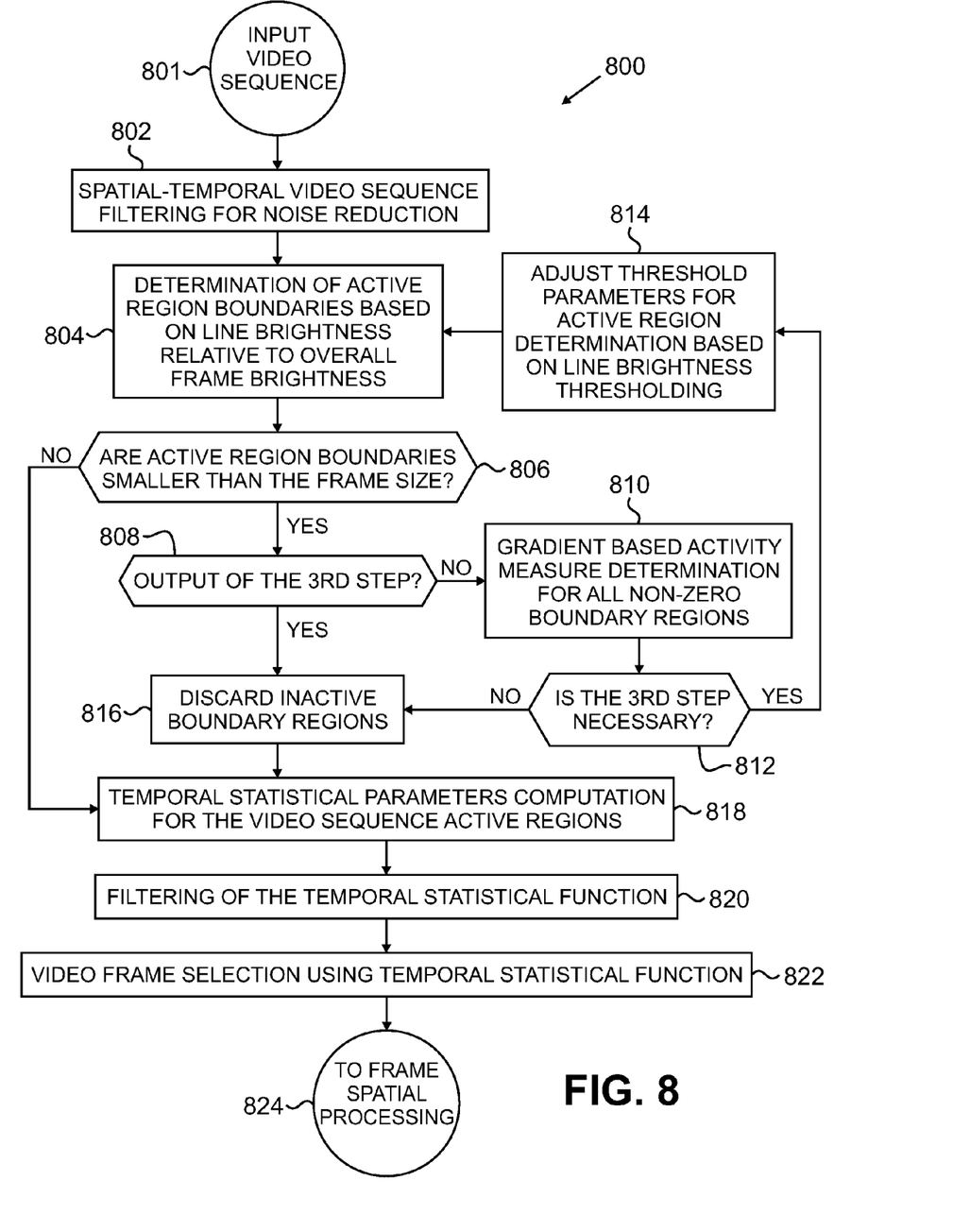
FIG. 8 illustrates a flowchart for video sequence preprocessing for frame active region determination and for selecting frames for further spatial processing in accordance with an embodiment of the present invention.

The flowchart of FIG. 8 presents processing steps 800 for video sequence preprocessing steps 204, frame active region determination step 206, and feature extraction processing for frame selection step 208 in accordance with an embodiment of the present invention. At step 801, an input video sequence is received. At step 802, the video sequence is filtered by a spatial Gaussian filter for noise reduction. In steps 804 to 814 video sequence frames are processed for active region determination in a three step active region determination process. At step 804, for every horizontal top and bottom line of pixels and vertical left and right line of pixels of a video frame, a normalized average brightness level is computed and then compared to frame brightness threshold computed as a percentage of the total normalized average brightness for the entire frame. If the normalized average brightness for a line of pixels is below frame brightness threshold that line is skipped. This process is continued starting from the outermost boundary of the frame until a region is reached where no normalized average brightness for a line is less than the frame brightness threshold. At step 806 the active region size is tested. If the active region size is smaller than the original frame size, and it is not the output of the $3^{rd}$ step 816, the active region determination process is continued in step 810, otherwise the step 818 is entered. At step 810 a gradient vector intensity is computed for each pixel, according to equation (2), and a normalized average sum of the intensity gradient vectors is computed for the entire boundary region. This normalized average sum of the intensity gradient vectors (activity measure for the preliminary boundary region to be discarded) is compared to an activity threshold parameter. If the activity measure for the boundary region shows sufficiently high activity (indicated by the activity threshold parameter), then the process of active region determination proceeds to step 812 and 814, otherwise it proceeds to step 812 and 816 and 818, and the current preliminary boundary region to be discarded is accepted as final.

At step 808, the region of the frame, enclosed with frame lines brighter than the given revised, or not revised, frame brightness threshold) represents the frame active region. The frame area up to the boundaries of the active region is discarded.

Frame selection is performed in steps 818, 820, and 822. At step 818 MAD parameters are computed for contiguous frame pairs in temporal succession of frames of a video sequence, and a temporal statistical function $f_0(n)$ is derived, where n represents the video sequence frame number running from 0 to the total number of frames in the video sequence. The $f_0(n)$ function is a time series with its samples having identical values as the set of MAD values computed for the entire video sequence. Subsequently $f_0(n)$ is filtered in step 820 by a median filter to suppress excessive positive and negative peaks due to abrupt scene changes and undesired video frame repetitions. At step 822, video frames are selected by analyzing the temporal statistical function $f_0(n)$ as follows. The $f_0(n)$ function is partitioned with a programmable size sliding window into multiple overlapping temporal partitions. The starting point of each sliding window in time succession is attached to local extrema of $f_0(n)$ determined within the scope of the previous sliding window position. Video frames are selected for further spatial processing at local extrema positions of $f_0(n)$ (alternately a maximum or a minimum position) within the scope of each sliding window. At step 824, the output of step 822 proceeds to frame processing process 212 of FIG. 2.

Figure 9:
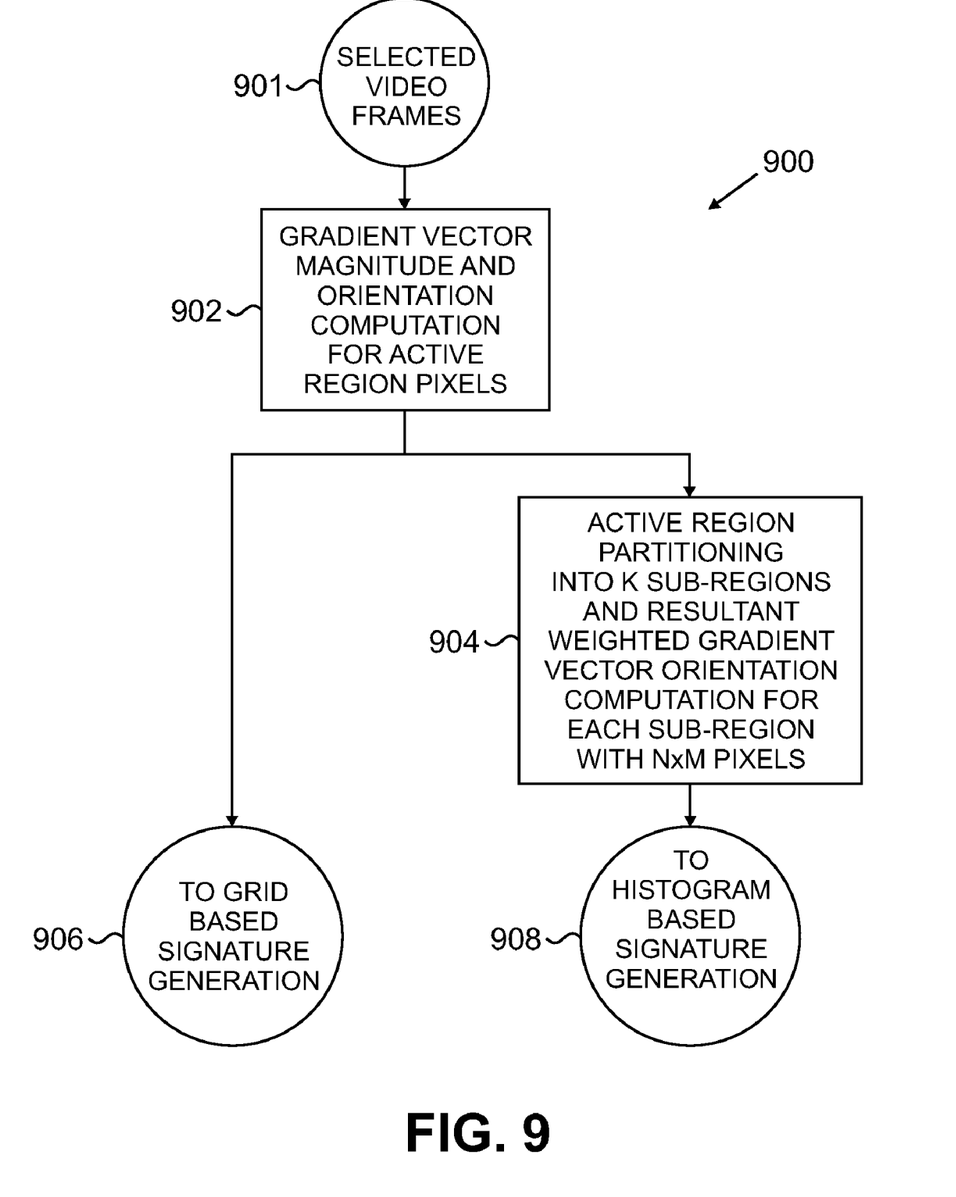
FIG. 9 illustrates a flowchart for selected frame processing to derive spatial gradient vector intensity and orientation for active region pixels and compute a resultant weighted spatial gradient vector orientation for rectangular regions of N×M pixels in accordance with an embodiment of the present invention.

FIG. 9 illustrates a flowchart 900 for the process of gradient intensity and orientation computation for each pixel of the frame active region to derive a descriptor as part of the process step 212 in accordance with an embodiment of the present invention. At step 902, spatial intensity gradient vector [(G(x) G(y)] 308, equation (1), is computed for each pixel within the active region, based on an 8-pixel neighborhood as shown in FIG. 4. At step 904 the frame active region is partitioned into K sub-regions with N×M pixels, and for each sub-region a sub-region gradient intensity $G_c$, equation (4), sub-region orientation $\theta_c$ equation (5), and a resultant weighted gradient vector orientation $\Omega_n$, equation (6), are computed. Next, the resultant weighted gradient vector orientations $\Omega_n$ computed for each sub-region in step 904 are passed via steps 906 and 908 to signature generation 1000 process in FIG. 10.

Figure 10:
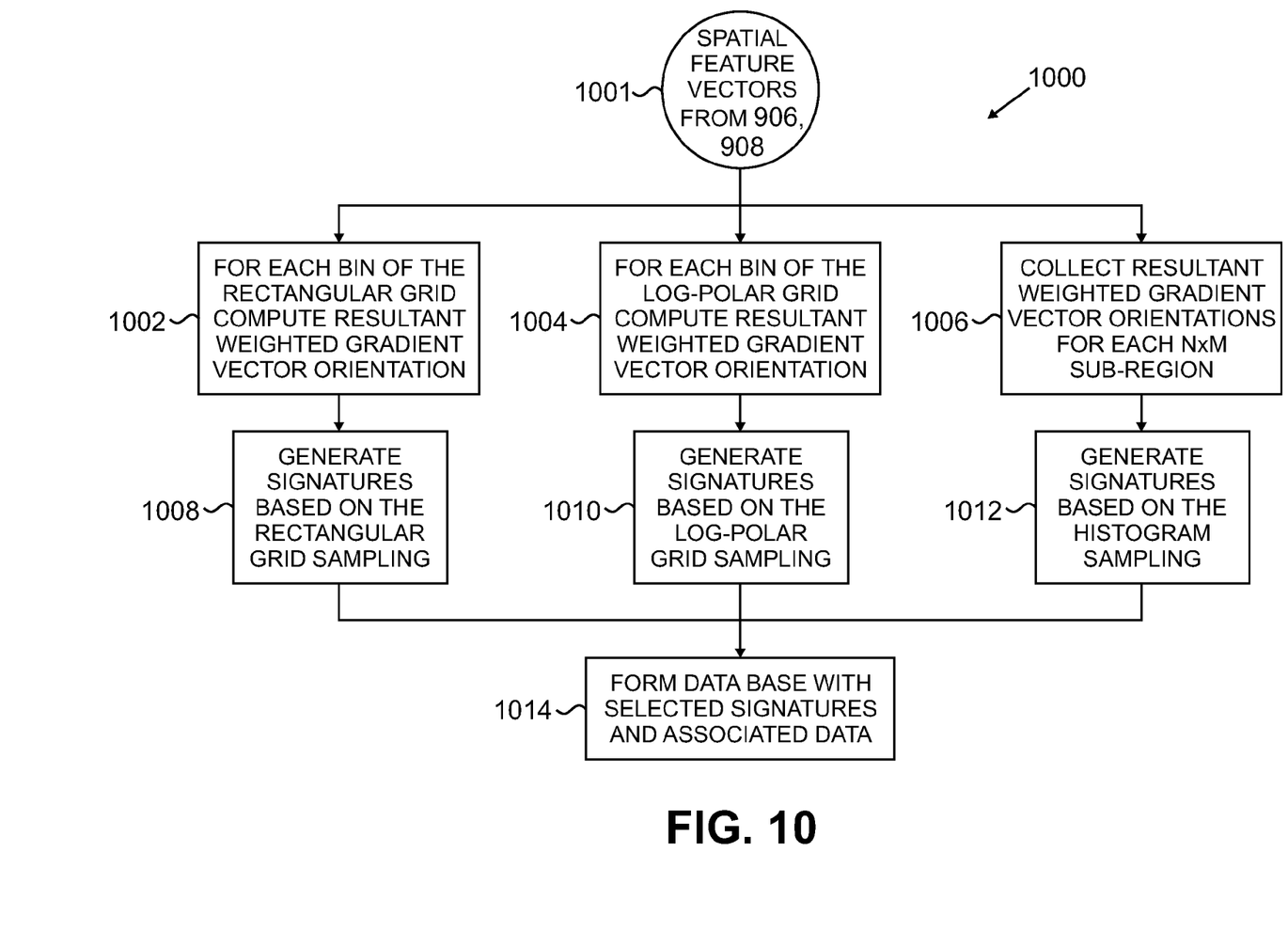
FIG. 10 illustrates a flowchart for signature generation and signature database formation based on the log-polar grid, rectangular grid, and a histogram of weighted gradient vector orientations, in accordance with the embodiments of the present invention.

FIG. 10 illustrates a flowchart for the signature generation process 1000 as part of steps 212 and 214 and signature database formation in accordance with an embodiment of the present invention. At step 1001, the spatial video feature vectors are received from steps 906 and 908, including pixel gradient vector intensity $G_p$, pixel phase angle (orientation) $\theta_p$, and resultant weighted gradient vector orientation $\Omega_n$ computed for the array of N×M size pixel sub-regions. At steps 1002 and 1008, multi-dimensional signatures are generated based on a rectangular grid sampling. An exemplary rectangular grid 602 is used as the functional space to form a set of sub-regions 604 for computation of $\Omega_k$ values. The $\Omega_k$ values are computed for each bin of the functional space based on the gradient vector intensity $G_p$ and pixel phase angle (orientation) $\theta_p$. The $\Omega$ value, computed for the entire rectangular functional space 602, is used to generate a binary value of 0 or 1, depending whether the $\Omega_k$ is less than or equal, or greater than the $\Omega$, respectively. The set of 0s and 1s corresponding to sub-regions of the rectangular grid form a multidimensional signature for the particular frame in question.

At steps 1004 and 1010 multi-dimensional signatures are generated based on a log-polar grid sampling. The diagram in FIG. 5 illustrates an exemplary log-polar functional space 500 inscribed into the active area of a video frame 502 to form bins, such as bin 504, for $\Omega_k$ computation according to equation (6). The $\Omega_k$ are computed for each. The $\Omega$ parameter is computed for the region outlined by the most outer circle 506 according to equation (7). The signature is generated by comparing each bin $\Omega_k$ value to the functional space region $\Omega$ value, and a 0 or 1 is assigned to the corresponding signature bit position depending whether the $\Omega_k$ for a bin is less than or equal to, or greater than the $\Omega$ for the entire functional space, respectively. The set of 0s and 1s corresponding to each bin of the log-polar grid form a multidimensional signature for the particular active video frame in question.

At steps 1006 and 1012, multi-dimensional signatures are generated based on a histogram of resultant weighted gradient vector orientations $\Omega_n$, n=1, . . . , m, computed for a set of sub-regions of size N×M covering the entire active area of a video frame. An exemplary 1-dimensional set of histogram bins 700, FIG. 7, are used to count the resultant weighted gradient vector orientations $\Omega_n$ falling in a particular range of the orientation angle space. The size of pixel sub-regions formed for $\Omega_n$ computation is chosen to be small enough, 4×4 pixel sub-regions, as an example, to provide a good statistical representation of the distribution of $\Omega_n$ values for the entire frame active region.

As computed in equation 6, $\Omega_n$ values represent resultant weighted gradient vector orientations, centered at each sub-region, with the total range in radians of $-\pi$ to $\pi$. For a collection of $\Omega_n$ values from a selected frame, a histogram is formed representing the distribution of these values over a range from $-\pi$ to $\pi$, or approximately −3.14 to 3.14, in radians. As an example, the histogram 700 of FIG. 7 represents 80 histogram bins, each with a span of angles of $2\pi/80$ radians. The histogram is populated with computed $\Omega_n$ values in a way that each of the 80 bins holds the count of these values falling in the range of the bin's phase angle. A threshold parameter 704 is introduced as the mean bin count value. This threshold parameter is used to generate a multidimensional signature as follows. The histogram is scanned left to right and each bin count is compared to the mean bin count, threshold 704. If a bin count is less than or equal to the threshold a 0 is assigned to the corresponding signature bit position, otherwise a 1 is assigned to the same bit position. The set of 0s and 1s corresponding to each bin of the histogram 700 form a multidimensional signature for the frame active region under consideration. The above example will generate an 80-bit signature.

At step 1014, a video database is formed with a set of selected signatures and associated data stored in a signature data base 220.

Upon reading this disclosure, those of skill in the art will appreciate additional alternative systems and methods for a scalable identification of digital video sequences in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

I claim:

1. A method for content based video sequence identification comprising:

determining preliminary active regions in frames of a video sequence filtered to reduce noise wherein preliminary inactive regions in a selected video frame are determined by selecting frame boundary lines, each line having a normalized average brightness level that is less than a programmed percentage of a total normalized average brightness for the selected video frame;

computing a gradient based activity measure in the preliminary inactive regions to adjust the programmed percentage of the total normalized average brightness for the selected video frame, wherein the active regions are determined based on the adjusted programmed percentage of the total normalized average brightness for the selected video frame:
  selecting a set of video frames in response to temporal statistical characteristics of the determined active regions;
  extracting spatial video features from the selected set of video frames; and
  generating multi-dimensional content based signatures based on the extracted spatial video features to identify the video sequence.

2. The method of claim 1, wherein determining active regions in frames comprises:
  processing lines selected from video frame edges advancing through successive lines inward across a frame, and marking the successive lines that have a normalized average brightness that are less than the programmed percentage of the total normalized average brightness for the frame, wherein the marked successive lines represent the preliminary inactive regions;
  determining a gradient based activity measure for the preliminary inactive regions;
  comparing the gradient based activity measure for the preliminary inactive regions to an activity threshold value, wherein the programmed percentage of the total normalized average brightness for the frame is adjusted based on the comparison;
  reprocessing the frame to mark lines selected from video frame edges advancing through successive lines inward across the frame that have a normalized average brightness that is less than the adjusted programmed percentage of the total normalized average brightness for the frame; and
  discarding frame inactive area leaving the determined active regions remaining in the frame.

3. The method of claim 1 further comprising:
  computing a normalized video frame brightness value for an entire frame and a frame brightness threshold parameter as a percentage of the normalized frame brightness value;
  computing a normalized line brightness value for lines around frame boundaries;
  comparing a normalized line brightness value for boundary lines with the frame brightness threshold parameter; and
  determining a preliminary inactive boundary region defined by a number of successive horizontal and vertical boundary lines having a normalized line brightness value below the frame brightness threshold parameter.

4. The method of claim 1 further comprising:
  deriving activity measures for preliminary inactive boundary regions by using an average intensity of a spatial gradient vector computed for pixels in the preliminary inactive boundary regions;
  comparing the activity measure for a preliminary inactive boundary region against an activity threshold; and
  deciding based on this comparison whether to accept the preliminary inactive boundary region as final or continue with active region determination.

5. The method of claim 4, wherein the activity measures are computed for each non-zero candidate inactive region around video frame boundaries as a normalized average sum of the intensity of spatial gradient vectors computed for pixels in the preliminary inactive boundary regions.

6. The method of claim 4 further comprising:
  repeating the determination of active regions in frames based on a normalized line brightness value for boundary lines with an adjusted frame brightness threshold parameter used for line brightness evaluation;
  enclosing a frame active region with horizontal, top and bottom, and vertical, left and right boundary lines having an average brightness that is less than the adjusted frame brightness threshold parameter; and
  discarding frame boundary areas up to the boundary lines of the frame active region.

7. The method of claim 1, wherein extracting spatial video features comprises:
  computing an intensity gradient vector $[G_x(x), G_y(y)]$, an intensity gradient vector magnitude a function of $[G_x(x), G_y(y)]$, and an intensity gradient vector phase $\theta_p$ for active region pixels; and
  computing multiple resultant weighted gradient vector orientations $\Omega_k$s each a function of $G_p$ and $\theta_p$ for sub-regions of the selected video frame as the extracted spatial video features for an active region of the selected video frame.

8. The method of claim 1, wherein generating multi-dimensional content based signatures comprises:
  inscribing a rectangular functional space in an active region of a selected video frame to form k rectangular bins;
  computing a resultant weighted gradient vector orientation $\Omega_k$ value, as a function of an intensity gradient vector magnitude and an intensity gradient vector phase for each rectangular bin;
  comparing the resultant weighted gradient vector orientation $\Omega_k$ value for each rectangular bin to a weighted gradient vector orientation $\Omega$ computed for the rectangular a functional space; and
  generating a multi-dimensional content based signature by assigning 0 or 1 to signature bit positions corresponding to the rectangular bins, depending whether $\Omega_k \leq \Omega$ or $\Omega_k > \Omega$, respectively.

9. The method of claim 1, wherein generating multi-dimensional content based signatures comprises:
  inscribing a log-polar functional space in an active region of a selected video frame to form k log-polar bins;
  computing a resultant weighted gradient vector orientation $\Omega_k$ value, as a function of an intensity gradient vector magnitude and an intensity gradient vector phase for each log-polar bin;
  comparing the resultant weighted gradient vector orientation $\Omega_k$ value for each log-polar bin to a weighted gradient vector orientation $\Omega$ value computed for the log-polar functional space; and
  generating a multi-dimensional content based signature by assigning 0 or 1 to the signature bit positions corresponding to the log-polar bins, depending whether $\Omega_k \leq \Omega$ or $\Omega_k > \Omega$, respectively.

10. The method of claim 1, wherein generating multi-dimensional content based signatures comprises:
  forming a histogram of resultant weighted gradient vector orientation $\Omega_k$ values computed for a set of sub-regions of size N×M covering a determined active region of a video frame;
  assigning to each histogram bin a bin count of $\Omega_k$ values falling into an assigned range;
  computing a mean value of bin counts for the histogram; and
  generating a signature by comparing each bin count to the mean value of bin counts for the histogram.

11. The method of claim 2, wherein the gradient based activity measure comprises:

calculating a gradient vector intensity for each pixel in the non-zero regions surrounding the preliminary active region; and calculating the gradient based activity measure as a normalized average sum of the gradient vector intensities.

12. The method of claim 1, wherein mean absolute difference (MAD) values are computed for contiguous pairs of video frame active regions in a succession of video frames in a video sequence.

13. The method of claim 12, wherein a temporal statistical function $f_0(n)$ is generated in response to the MAD values, wherein the $f_0(n)$ function is a time series with its samples having identical values as the MAD values computed for the entire video sequence.

14. The method of claim 13, wherein the $f_0(n)$ function is partitioned with a programmable size sliding window into multiple overlapping temporal partitions, wherein the starting point of each sliding window in time succession is attached to local extrema of $f_0(n)$ computed for the previous sliding window.

15. The method of claim 13 wherein video frames are selected for further spatial processing at extrema positions of $f_0(n)$ local to sliding windows, alternating between a local maximum or a local minimum position within the scope of each sliding window.

16. A method for content based video sequence identification comprising:

determining active regions in frames of a video sequence filtered to reduce noise, wherein the active regions in frames are determined by comparing a normalized sum of gradient vector intensities computed for preliminary inactive regions with an activity threshold in a process that adjusts a programmed percentage of a total normalized average brightness for the frame to refine the selection of regions that exceed the adjusted programmed percentage of the total normalized average brightness for the frame as the active regions;

selecting a set of video frames in response to temporal statistical characteristics of the determined active regions;

extracting spatial video features from the selected set of video frames; and generating multi-dimensional content based signatures based on the extracted spatial video features to identify the video sequence.

17. The method of claim 16, wherein a normalized sum of gradient vector intensities computed for the preliminary inactive regions is used to refine the initial active region determination.

* * * * *